Figure 1:
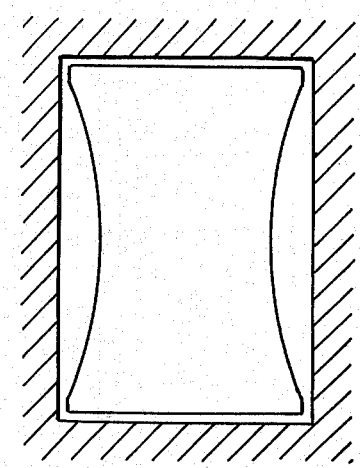
Figure 2:
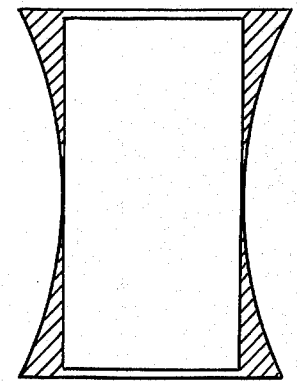

United States Patent [19]
Bürger et al.

[11] 3,956,203
[45] May 11, 1976

[54] MANUFACTURE OF PARTICULATE EXPANDABLE STYRENE POLYMERS REQUIRING SHOT MINIMUM RESIDENCE TIMES IN THE MOLD

[75] Inventors: Heinz Bürger, Ludwigshafen; Ludwig Zuern, Bad Duerkheim; Karl Buchholz, Ludwigshafen; Erhard Stahnecker, Ziegelhausen, all of Germany

[73] Assignee: Badische Anilin- & Soda-Fabrik Aktiengesellschaft, Ludwigshafen (Rhine), Germany

[22] Filed: July 28, 1975

[21] Appl. No.: 599,526

Related U.S. Application Data

[63] Continuation of Ser. No. 383,545, July 30, 1973, abandoned.

[30] Foreign Application Priority Data
Aug. 3, 1972  Germany.......................... 2238128

[52] U.S. Cl............................ 260/2.5 B; 260/2.5 E; 260/2.5 FP; 260/880 R; 260/892; 264/53; 264/211
[51] Int. Cl................................................ C08j 9/24
[58] Field of Search........... 260/2.5 FP, 2.5 B, 2.5 E

[56] References Cited
UNITED STATES PATENTS
3,093,599    6/1963    Mueller-Tamm et al. ........ 260/2.5 B

*Primary Examiner*—Morton Foelak
*Attorney, Agent, or Firm*—Johnston, Keil, Thompson & Shurtleff

[57] ABSTRACT

Particulate expandable styrene polymers requiring short residence times in the mold are obtained by polymerizing styrene and, optionally, other copolymerizable monomers in the presence of expanding agents and from 0.001 to 0.1% by weight of a brominated oligomer or polymer of a 1,3-diene for at least part of the time at temperatures of from 110° to 140°C.

5 Claims, 2 Drawing Figures

MANUFACTURE OF PARTICULATE EXPANDABLE STYRENE POLYMERS REQUIRING SHOT MINIMUM RESIDENCE TIMES IN THE MOLD

This is a continuation of application Ser. No. 383,545, filed July 30, 1973, now abandoned.

According to one process which is very widely used in industry articles of foamed styrene polymers are made by expanding particulate styrene polymers in molds. In this process the foamable styrene particles containing expanding agent are first heated with steam or a hot gas to a temperature above the softening point of the styrene polymer so that they expand to form a loose material. This step is known as pre-expansion. The prefoamed styrene polymers are stored and then expanded in a perforated pressure-resistant mold by renewed heating with steam so that they fuse together to form a molding whose dimensions correspond to those of the mold cavity. This second step is known as molding. Following molding, the article thus obtained is cooled in the mold. If the molding is removed from the mold prematurely, it may undergo deformation due to post-expansion. Since foamed plastics are good insulators, relatively long times are required for cooling the moldings. The period which must elapse before a molding can be removed from the mold without post-expansion occurring is usually referred to as the minimum mold residence time.

The minimum mold residence time may be determined, for example, by increasing the residence time in steps until the molding removed from the mold no longer undergoes postexpansion. A simpler method is to measure the pressure drop within the molding by means of a probe. This method is described in a BASF leaflet entitled "Probe for the measurement of pressure inside expanded Styropor blocks."

The minimum mold residence time is governed essentially by three factors: the technical characteristics of the equipment, e.g. steam supply, the molding conditions and the product quality. To achieve a comparative assessment of the product quality, it is of course necessary for the first two factors to be kept constant.

It is known that moldings which can be removed from the mold after relatively short cooling times may be obtained by foaming particulate styrene polymers containing expanding agent and coated with small amounts of an organic compound capable of dissolving or swelling the styrene polymer. However, this process has the disadvantage that the particles coated with organic compounds cannot be expanded to the same extent as uncaoted particles under similar conditions. Futhermore, when coated particles are expanded, the foams obtained may have an uneven cellular structure. This is particularly undesirable in the manufacture of shaped articles intended for decorative purposes. It has also been found that such coated particles are particularly sensitive to pressure immediately after pre-expansion with the result that they may be readily deformed when transported pneumatically.

It is also known that particulate expandable styrene polymers containing in homogeneous distribution small amounts of a brominated oligomer or polymer of a 1,3-diene give moldings which may be removed from the mold after short residence times without the occurrence of post-expansion. Such expandable styrene polymers are made, according to German Printed Application No. 1,256,888, by polymerizing styrene or mixtures of styrene and other copolymerizable monomers in the presence of a low-boiling hydrocarbon and the bromine compound, temperatures of up to 100°C being used according to the Examples of said citation. Moldings made from such products are distinguished by short minimum mold residence times and give excellent results, particularly in the manufacture of foam blocks of relatively small size.

We have now found that, surprisingly, an even greater reduction in the minimum mold residence time can be achieved if the procedure proposed by the present invention is followed, which procedure also makes it possible to manufacture very large blocks of foam in a satisfactory manner.

The process of the invention consists in making particulate expandable styrene polymers by polymerizing styrene or mixtures of styrene with other copolymerizable monomers in the presence of low-boiling hydrocarbon expanding agents and from 0.001 to 0.1% by weight, based on the monomers, of a brominated oligomer or polymer of a 1,3-diene, the particles which form during the polymerization in the presence of bromine compounds being subjected, in the course of their manufacture, to temperatures of between 110° to 140°C and preferably between 115° to 135°C. The process thus characterized may be carried out by effecting the entire polymerization process at temperatures between 110° and 140°C. Alternatively, polymerization may be effected in stages, the first polymerization stage being carried out at polymerization temperatures below the said range and polymerization being continued to completion in a second polymerization stage at temperatures within said range. Polymerization may be carried out by conventional methods, particularly by granular polymerization, yielding particulate styrene polymers.

Particulate expandable polystyrene produced by the process of the invention make possible the production of foam articles having extremely short minimum mold residence times. Furthermore, such foam articles show little shrinkage even when their dimensions are large and show substantially no tendency to collapse. Polymerization temperatures of more than 140°C are not recommended, since they bring no further reduction in the minimum mold residence time and merely increase production costs.

By styrene polymers we mean polystyrene and copolymers of styrene containing at least 50% by by weight of polymerized units of styrene. Examples of suitable comonomers are $\alpha$(-methylstyrene, acrylonitrile, methacrylonitrile, acrylates or methacrylates of alcohols of from 1 to 8 carbon atoms, vinyl pyridine, N-vinyl compounds such as N-vinyl carbazole, butadiene, and small amounts, for example from 0.001 to 1.0%, preferably from 0.01 to 0.1%, by weight of divinyl benzene.

The molding compositions used for manufacturing the foamed articles may also contain styrene polymers which have been modified so as to render them impact-resistant. Examples of such impact-resistant styrene polymers are mixtures obtained by polymerizing styrene, optionally together with other monomers, in the presence of finely divided rubbery polymers. Such polymers may also be obtained by mixing styrene/acrylonitrile copolymers with butadiene or acrylate polymers.

The molding compositions contain expanding agents which are conveniently conventional liquid or gaseous organic compounds which are non-solvents for the polymer and have boiling points below the softening point of the polymer, e.g. aliphatic or cycloaliphatic hydrocarbons such as propane, butane, pentane, hexane, heptane, cyclohexane and halohydrocarbons such as methyl chloride, dichlorodifluoromethane and 1,2,2-trifluoro-1,1,2-trichloroethane. The compositions may also contain mixtures of said expanding agents. It is advantageous to use the expanding agents in a concentration of from 3 to 12% by weight of the styrene polymer.

The molding compositions may also contain additives such as plasticizers, lubricants, stabilizers, dyes and fillers.

Examples of suitable brominated polymers of 1,3-dienes to be used in the present invention are bromination products of butadiene polymers, isoprene polymers or chloroprene polymers. Of these, butadiene polymers are particularly preferred. The oligomers or polymers should have a degree of polymerization of at least 2. Alhtough polymers of any higher degree of polymerization may be used, it is usually not necessary for the degree of polymerization of the bromination product to be more than 2,000. The bromination product should conveniently contain more than 40% of bromine. Specific examples of suitable brominated polymers are 1,2,5,6-tetrabromo-cyclooctane, 1,2-dibromocyclooctene-5, 1,2,5,6,9,10-hexabromocyclododecane, brominated 1-vinyl-3-cyclohexene and brominated polybutadiene having a linear structure. Also suitable are bromination products of natural rubbers.

The molding compositions are in particulate form, for example in the form of beads. The particles advantageously have a diameter of from 0.1 to 6 mm and preferably from about 0.4 to 3 mm.

The particulate expandable styrene polymers produced by the process of the invention contain the brominated polymers in homogeneous distribution. This is achieved, for example, by polymerizing monomeric styrene, optionally together with other monomers, in the presence of an expanding agent and the brominated polymer in aqueous suspension or by adding the bromine-containing polymer, optionally together with expanding agent, to the polymerization mixture at a point at which the particles of polymer no longer divide.

The styrene polymers of the invention are molded by conventional methods by heating in molds which are not gas-tight when closed, during which process they expand and fuse together to form articles having dimensions corresponding to those of the mold cavity. Methods of processing expandable styrene polymers are described, for example, in articles by F. Stastny in "Kunststoffe" 44th year, 1954, pp. 173 to 180 and in "Der Plastverarbeiter" 1954, pp. 260 to 271. Procedures are also described by H. L. v. Cube and K. E. Pohl in "Die Technologie des schaeumbaren Polystyrols" published by Dr. Alfred Huthig Verlag GmbH, Heidelberg, 1965.

We have found that articles of large dimensions and produced by molding the molding compositions of the invention may be removed from the mold after relatively short residence times. In particularly favorable cases, the molding may be removed from the mold after a residence time of only a few minutes, there being neither post-expansion nor undesirable collapse or shrinkage. It is also of particular advantage that the molding compositions of the invention may be used for making foam articles having a very fine and even cellular structure.

The invention is further illustrated by the following Examples in which parts are by weight.

EXAMPLE 1

A mixture is prepared from the following in an autoclave equipped with a flat paddle agitator:

|  | Parts |
| --- | --- |
| styrene | 100 |
| dibenzoyl peroxide | 0.4 |
| t-butyl perbenzoate | 0.3 |
| n-pentane | 5.5 |
| isopentane | 1.5 |
| sodium acetate | 0.1 |
| sodium pyrophosphate | 0.05 |
| sodium chloride | 1.0 |
| water | 200 |
| 1,2,5,6,9,10-hexabromocyclododecane | x |

This mixture is then polymerized with stirring in the sealed pressure vessel for a period of 8 hours at 80°C, after which it is heated to 90°C in the course of 30 minutes and then held at 90°C for a further 5 hours, whereupon it is heated to 110°C in the course of 60 minutes and held at 110°C for a further 5 hours. 2 hours after the commencement of polymerization there is added to the polymerization mixture, at 80°C, a solution of 0.3 part of polyvinyl pyrrolidone (K value 90) in 2.7 parts of water. After a total polymerization time of 8 hours, pressurized gaseous nitrogen is fed to the polymerization vessel, at 80°C, to raise the internal pressure of the vessel from 1 atm. gauge to 4 atm. gauge. On completion of the entire polymerization cycle (80°, 90°, 110°C) the batch is cooled to 30°C and the vessel is vented.

The contents of the vessel consist of polymer beads and aqueous phase. The beads are separated from the aqueous phase with a sieve having an aperture of 0.2 mm, after which they are washed with clean water and dried in air in a thin layer at room temperature. The particle size is in the range 0.4 to 2.3 mm, the most frequently occurring particle size being 1.1 mm.

The beads are prefoamed in a stream of steam to a bulk density of 16 g/l and then stored for 48 hours at room temperature with free access to air. A mold measuring 1,016 × 1,016 × 505 mm and having perforated walls is then filled to the brim with the prefoamed bulk material, which is then steamed through the perforations of the mold with steam at a pressure of 0.8 atm. gauge, the steaming time being 10 seconds. The particles are thus fused together to form a dense foam block. The mold is then allowed to cool and is opened after the minimum mold residence times, whereupon the block is removed from the mold.

The minimum mold residence time is determined by means of a probe for measuring the pressure in the block (hereinafter referred to as "pressure probe"). 24 hours after removal of the block from the mokd, its shrinkage (defined in FIG. a) and degree of collapse (defined in FIG. b) are determined. The results are given below in Table 1:

TABLE 1

| x parts of 1,2,5,6,9,10-hexabromocyclododecane | minimum mold residence time (minutes) | shrinkage | collapse |
| --- | --- | --- | --- |
| 0 | 80 | 3 mm (0.3%) | 3.5 mm (0.7%) |
| 0.005 | 50 | 3.5 mm (0.35%) | 4.5 mm (0.9%) |
| 0.01 | 38 | 4 mm (0.4%) | 5 mm (1.0%) |
| 0.1 | 10 | 5 mm (0.5%) | 7 mm (1.4%) |

EXAMPLE 2

A mixture is prepared from the following in an autoclave equipped with a flat paddle agitator:

| | Parts |
| --- | --- |
| styrene | 100 |
| t-butyl perbenzoate | 0.25 |
| t-butyl peroctoate | 0.12 |
| sodium acetate | 0.1 |
| sodium pyrophosphate | 0.05 |
| 1,2,5,6,9,10-hexabromocyclododecane | x |
| water | 100 |

This mixture is stirred in the sealed autoclave for 2 hours at 90°C, 1 hour at 100°C, 2 hours at 110°C and 4 hours at 122°C. 2 hours after the commencement of polymerization, 3 parts of a 10% w/w solution of polyvinyl pyrrolidone (K value 90) in water followed by a mixture of 5.5 parts of n-pentane and 1.5 parts of isopentane are added to the polymerization mixture at 90°C.

On completion of polymerization, the batch is cooled to 30°C and treated in a manner similar to that described in Example 1. The beads obtained have diameters of from 0.4 to 2.5 mm, the most frequently occurring particle size being 0.2 mm.

The beads are prefoamed in a stream of steam to give a bulk density of 16 to 17 g/l and then stored for 48 hours at room temperature with free access to air, whereupon they are molded into blocks as described in Example 1.

The minimum mold residence time, shrinkage and degree of collapse are measured as in Example 1. The results are given in Table 2 below:

TABLE 2

| x parts of 1,2,5,6,9,10-hexabromocyclododecane | minimum mold residence time (minutes) | shrinkage | collapse |
| --- | --- | --- | --- |
| 0 | 89 | 3 mm (0.3%) | 3 mm (0.6%) |
| 0.01 | 28 | 4 mm (0.4%) | 5.5 mm (1.1%) |
| 0.05 | 14 | 4.5 mm (0.45%) | 6 mm (1.2%) |

EXAMPLE 3

A mixture is prepared from the following in a stirred autoclave:

| | Parts |
| --- | --- |
| styrene | 90 |
| acrylonitrile | 10 |
| n-pentane | 6 |
| hexane | 0.5 |
| lauroyl peroxide | 0.45 |
| t-butyl perbenzoate | 0.35 |
| 1,2,5,6,9,10-hexabromocyclododecane | 0.02 |
| water | 100 |
| sodium pyrophosphate | 0.1 |
| polyvinyl pyrrolidone (K value 80) | 0.3 |

This mixture is then heated with stirring in the sealed autoclave for 10 hours at 80°C, 6 hours at 90°C and 4 hours at 120°C.

On completion of the polymerization, the batch is cooled to 30°C and treated as described in Example 1. The beads obtained have diameters of from 0.6 to 2.0 mm, the most frequently occurring diameter being from 0.9 to 1.1 mm.

The beads are prefoamed to give a bulk density of 17 g/l, stored and processed into blocks, as described in Example 1.

The minimum mold residence time, as measured with a pressure probe, is 15 minutes.

COMPARATIVE EXAMPLE

An expandable styrene/acrylonitrile copolymer is made from a mixture of the starting materials given in Example 3, except that polymerization is carried out for 10 hours at 80°C, 6 hours at 90°C and 4 hours at 95°C.

On completion of the polymerization, the batch is treated and molded into blocks as described in Example 1.

The minimum mold residence time, as measured with a pressure probe, is 65 minutes.

EXAMPLE 4

A mixture is prepared from the following in an autoclave equipped with a flat paddle agitator:

| | Parts |
| --- | --- |
| styrene | 100 |
| dibenzoyl peroxide | 0.4 |
| t-butyl perbenzoate | 0.3 |
| n-pentane | 5.5 |
| isopentane | 1.5 |
| sodium acetate | 0.1 |
| sodium pyrophosphate | 0.05 |
| sodium chloride | 1 |
| water | 200 |
| brominated polybutadiene (degree of polymerization 180; bromine content 70%) | 0.02 |

The mixture is then heated with stirring in the sealed autoclave for 8 hours at 80°C, after which it is heated to 90°C in the course of 30 minutes and then held at 90°C for 5 hours and then heated to 118°C in the course of 60 minutes and held at that temperature for a further 5 hours. 2 hours after the commencement of polymerization, a solution of 0.3 part of polyvinyl pyrrolidone (K value 90) in 2.7 parts of water is added to the polymerization mixture at 80°C. After a total polymerization time of 8 hours, pressurized nitrogen is passed into the pressure vessel at 80°C so as to raise the internal pressure of the vessel from 1 atm. gauge to 4 atm. gauge. On completion of the total polymerization cycle (80°, 90°, 118°C), the batch is cooled to 30°C and the autoclave vented.

The contents of the vessel consist of polymer beads and the aqueous phase. The beads are separated from the aqueous phase using a sieve having an aperture of 0.2 mm and are then washed with clean water and dried in air in a thin layer at room temperature. The particle size of the beads is from 0.4 to 2.3 mm, the most frequently occurring diameter being 1.2 mm.

The beads are prefoamed to give a bulk density of from 16 to 17 g/l, stored and molded into a block, as described in Example 1. The minimum mold residence time, as measured with a pressure probe, is 2 minutes.

EXAMPLE 5

A mixture is prepared from the following in an autoclave equipped with a flat blade agitator:

|  | Parts |
|---|---|
| styrene | 100 |
| dibenzoyl peroxide | 0.4 |
| t-butyl perbenzoate | 0.3 |
| n-pentane | 5.5 |
| isopentane | 1.5 |
| sodium acetate | 0.1 |
| sodium pyrophosphate | 0.05 |
| sodium chloride | 1 |
| water | 200 |
| 1,2,5,6-tetrabromocyclooctane | 0.01 |

This mixture is stirred in the sealed autoclave and heated for 8 hours at 80°C and then heated to 90°C in the course of 30 minutes and held at 90°C for 5 hours, whereupon it is heated to 130°C in the course of 60 minutes and then held at that temperature for a further 5 hours. 2 hours after the commencement of polymerization, a solution of 0.3 part of polyvinyl pyrrolidone (K value 90) in 2.7 parts of water is added to the batch at 80°C. 8 hours after the commencement of polymerization, pressurized nitrogen gas is fed to the vessel at 80°C to raise the internal pressure of the vessel from 1 to 4 atm. gauge. On completion of the total polymerization cycle (80°, 90°, 130°C) the batch is cooled to 30°C and the autoclave vented.

The contents of the vessel consist of polymer beads and aqueous phase. The beads are separated from the aqueous phase using a sieve having an aperture of 0.2 mm and are then washed with clean water and dried in air in a thin layer at room temperature. Their particle size is from 0.4 to 2.3 mm, the most frequently occurring diameter being 1.0 mm.

The beads are prefoamed to give a bulk density of from 16 to 17 g/l, stored and molded into a block, as described in Example 1.

The minimum mold residence time, as measured with a pressure probe, is 18 minutes.

We claim:

1. A process for the manufacture of particulate expandable styrene polymers requiring short minimum mold residence times by polymerizing styrene or mixtures of styrene and other copolymerizable monomers in the presence of low-boiling hydrocarbon expanding agents and from 0.001 to 0.1% by weight, based on the monomers, of a brominated oligomer or polymer of a 1,3-diene having a maximum degree of polymerization of 2000 and containing more than 40% by weight of bromine at elevated temperatures, wherein the particles forming during polymerization of styrene or said mixtures in the presence of the bromine compounds are heated, in the course of their manufacture, to temperatures of from 110° to 140°C.

2. A process as claimed in claim 1 wherein the polymerization is carried out at a temperature in the range of 115–135°C for at least part of the total polymerization time.

3. A process as claimed in claim 1 wherein the polymer particles contain in homogeneous distribution from 0.001 to 0.1% by weight, based on the styrene polymer, of a brominated oligomer or polymer of a 1,3-diene selected from the group consisting of butadiene, isoprene and chloroprene having a maximum degree of polymerization of 2000 and more than 40% by weight of bromine.

4. A process as claimed in claim 1 wherein styrene itself is polymerized to form particulate expandable polystyrene.

5. A process as claimed in claim 1 wherein a mixture of styrene and a member from the group consisting of o-methylstyrene, acrylonitrile, methacrylonitrile, an acrylate or methacrylate of alcohols of from 1 to 8 carbon atoms, vinyl pyridine, N-vinyl carbazole, butadiene and divinylbenzene are copolymerized, the copolymer containing at least 50% by weight of polymerized units of styrene and further containing, in the case of divinylbenzene, 0.01 to 1.0% of divinylbenzene.

* * * * *